US006875340B2

(12) United States Patent
Zong et al.

(10) Patent No.: US 6,875,340 B2
(45) Date of Patent: Apr. 5, 2005

(54) PROCESS FOR ADSORPTIVE DESULFURIZATION OF LIGHT OIL DISTILLATES

(75) Inventors: Baoning Zong, Beijing (CN); Xiangkun Meng, Beijing (CN); Hailong Lin, Beijing (CN); Xiaoxin Zhang, Beijing (CN); Xuhong Mu, Beijing (CN); Enze Min, Beijing (CN)

(73) Assignees: China Petroleum & Chemical Corporation, Beijing (CN); Research Institute of Petroleum Processing, Sinopec, Beijing (CN)

( * ) Notice: Subject to any disclaimer, the term of this patent is extended or adjusted under 35 U.S.C. 154(b) by 204 days.

(21) Appl. No.: 10/217,479

(22) Filed: Aug. 14, 2002

(65) Prior Publication Data

US 2003/0106841 A1 Jun. 12, 2003

(30) Foreign Application Priority Data

| Aug. 16, 2001 | (CN) | ......... 01130631 A |
| Aug. 16, 2001 | (CN) | ......... 01130632 A |
| Aug. 16, 2001 | (CN) | ......... 01130633 A |
| Aug. 16, 2001 | (CN) | ......... 01130634 A |
| Aug. 9, 2002 | (CN) | ......... 02126016 A |

(51) Int. Cl.[7] .......... C10G 45/04; C07C 7/11
(52) U.S. Cl. ......... 208/208 R; 208/213; 208/217; 208/214; 585/820; 585/823
(58) Field of Search ......... 208/208 R, 213, 208/217, 244; 585/820, 823

(56) References Cited

U.S. PATENT DOCUMENTS

| 2,876,196 A | | 3/1959 | Thorn ......... 208/244 |
| 3,485,746 A | * | 12/1969 | Setzer et al. ......... 208/244 |
| 3,485,884 A | | 12/1969 | Davis ......... 585/807 |
| 4,247,987 A | * | 2/1981 | Coulaloglou et al. ......... 34/249 |
| 4,419,224 A | * | 12/1983 | Miller et al. ......... 208/244 |
| 4,592,829 A | | 6/1986 | Eberly, Jr. et al. ......... 208/89 |
| 6,221,280 B1 | | 4/2001 | Anumakonda et al. ......... 252/372 |
| 6,368,996 B1 | | 4/2002 | Mu et al. |
| 6,649,043 B1 | * | 11/2003 | Chen et al. ......... 208/213 |

OTHER PUBLICATIONS

J.-F. Deng et al., Catalysis Today, vol. 51, 1999, pp. 113–125.

A, Molnar et al., Advanced in Catalysis, vol. 36, 1989, pp. 329–383.

D.D. Whitehurst et al., Advanced in Catalysis, vol. 42, pp. 345–471.

H.Hu et al., Journal of Catalysis, vol. 221, 2004, pp. 612–618.

* cited by examiner

*Primary Examiner*—Walter D. Griffin
*Assistant Examiner*—Tam M. Nguyen
(74) *Attorney, Agent, or Firm*—Greenblum & Bernstein, P.L.C.

(57) ABSTRACT

A process for adsorptive desulfurization of gasoline or diesel oil or aromatics lower than $C_{12}$ containing organic sulfide impurities, wherein these feedstocks contact an amorphous alloy adsorbent comprising nickel as a major active component in a fluidized bed reactor or a magnetic-stabilized fluidized bed reactor or a slurry bed reactor. There is only a single diffuse peak at $2\theta=45°$ in the $2\theta$ range from $20°$ to $80°$ in the X-ray diffraction (XRD) pattern of the adsorbent. The adsorbent consists of 50–95 wt % of nickel, 1–30 wt % of aluminum, 0–35 wt % of iron, and 0–10 wt % of one or more metals selected from copper, zinc, molybdenum, chromium, and cobalt.

14 Claims, No Drawings

PROCESS FOR ADSORPTIVE DESULFURIZATION OF LIGHT OIL DISTILLATES

FIELD OF THE INVENTION

The present invention relates to a process for adsorptive desulfurization of light oil distillates, in particular to a process for adsorptive desulfurization of Gasolines diesel oil, or aromatics lower than $C_{12}$ containing organic sulfide impurities using an adsorbent comprising nickel as a major active component.

BACKGROUND OF THE INVENTION

Sulfur-containing compounds in gasoline and diesel oil convert to sulfur oxides ($SO_x$) after combustion, leading to the formation of acid rain when emitted into the atmosphere. Furthermore, sulfur oxides in automobile tail-gas would result in an irreversible poisoning of the catalyst for automobile tail-gas conversion which greatly lowers the efficiency of the automobile tail-gas converter for conversion of nitrogen oxide ($NO_x$), unburned hydrocarbons, particulates and the like, and thereby severely pollutes the environment. Therefore, lowering the content of sulfur in gasoline and diesel oil is one of the effective ways to improve the quality of the air and solve the environmental problem.

To achieve the standard of low sulfur gasoline and diesel oil, the commonly used processes for the desulfurization of gasoline and diesel oil include dethiolation by catalytic oxidation and catalytic hydrodesulfurization. The dethiolation process by catalytic oxidation can only remove thiols, but has no removing effect on relatively large amounts of thiophenes in gasoline and benzothiopbenes in diesel oil. In addition, the dethiolation process by catalytic oxidation has a problem of treatment of the harmful liquid waste and disulfides. Catalytic hydrodesulfurization needs high temperature, high pressure and hydrogen atmosphere, so the investment on the equipment and operating cost are high. Moreover, this process causes a loss of octane number of gasoline during the treatment and consumes a great amount of hydrogen.

Aromatics derived from oil refining and coal coking such as benzene, toluene, ethyl benzene, xylene, and aromatics higher than $C_9$, also contain a small amounts of organic sulfides such as thiols, thioethers, thiophene, alkyl thiophenes, benzothiophenes, etc. The presence of these organic sulfides affects the quality of the aromatics and has a harmful effect on their applications. For example, the sulfur in feedstock benzene may cause the deactivation of the ruthenium catalyst for hydrogenation in the partial hydrogenation of benzene to cyclohexene, when $C_9$ or $C_{10}$ aromatics are used as a working solvent in the production of hydrogen peroxide using the anthraquinone process, the sulfur therein may cause the deactivation of the hydrogenation catalyst.

Removing sulfides in gasoline, diesel oil or aromatics using adsorptive process is a novel technology, which makes use of the adsorption selectivity of the adsorbent to the polar sulfides such as thiols, thiophene, etc, to remove the sulfides from gasoline, diesel oil or aromatics. Adsorptive desulfurization not only has the benefits of little investment, simple technology, but also has the advantages of little loss in the yield and octane number of gasoline, no consumption of hydrogen, no need of severe reaction conditions such as high temperature and high pressure when compared with the traditional desulfurization method by either oxidation or hydrogenation used for gasoline and diesel oil. The major types of adsorbents for desulfurization of gasoline and diesel oil reported presently are: oxide adsorbents ($\gamma$-$Al_2O_3$, $TiO_2$, $ZrO_2$, $ZnO$, $SiO_2$), oxide adsorbents supporting metals (Ni, Na, K, Ca, Ba), molecular sieve adsorbents (A, X, Y, TS-1, SAPO-34, MCM-41), and ion-exchanged molecular sieve adsorbents, etc. The adsorbents used in the desulfurization of aromatics are mainly supported-type oxide adsorbents supporting metals (Ni, Pd, Pt, Cu, etc), as those disclosed in U.S. Pat. No. 2,876,196, U.S. Pat. No. 3,485,884, U.S. Pat. No. 4,419,224, U.S. Pat. No. 4,592,829, etc.

U.S. Pat. No. 6,221,280 discloses that Raney nickel can be used as an adsorbent to remove thiophene sulfur remained in hydrocarbon fuels after hydrodesulfurization.

As far as the present inventor knows, there has no report on the amorphous alloy with nickel as a major active component of the adsorbent for adsorptive desulfurization as yet.

SUMMARY OF THE INVENTION

The object of the present invention is to provide a novel process for adsorptive desulfurization of light oil distillates.

The adsorptive desulfurization process provided by the present invention comprises contacting a light oil distillate which contains organic sulfur impurities with an amorphous alloy adsorbent comprising nickel as a major active component to carry out adsorptive desulfurization. The contact is carried out at a temperature from room temperature to 120° C., and at a pressure from the normal pressure to 1.0 MPa.

There is only a single diffuse peak at $2\theta=45°$ in a $2\theta$ range from 20° to 80° in the X-ray diffraction (XRD) pattern of the amorphous alloy adsorbent used in the present invention. The adsorbent consists of 50–95 wt % of nickel, 1–30 wt % of aluminum, 0–35 wt % of iron, and 0–10 wt % of one or more metals selected from the group consisting of copper, zinc, molybdenum, chromium, and cobalt.

The adsorptive desulfurization process provided by the present invention uses a nickel based amorphous alloy as an adsorbent with strong ability to adsorb organic sulfides, and has the advantages of simple technology, little investment, possibility for the adsorbent to be regenerated, and better desulfurization effect with the desulfurization rate for both gasoline and hydrogenated diesel oil higher than 60%, and the sulfur in aromatics lower than $C_{12}$ removed to below 0.05 ppm.

DESCRIPTION OF THE PREFERRED EMBODIMENTS

The process for the adsorptive desulfurization of light oil distillates provided by the present invention is suitable for the adsorptive desulfurization of gasoline, diesel oil fraction, or aromatics lower than $C_{12}$. This process comprises contacting gasoline or diesel oil or aromatics lower than $C_{12}$ which contain organic sulfide impurities with an adsorbent to carry out adsorptive desulfurization, wherein the adsorbent used is a amorphous alloy with nickel as a major active component and the contact is carried out in a fluidized bed reactor or a magnetic-stabilized fluidized bed reactor or a slurry bed reactor. The temperature for the contact is in a range from room temperature to 120° C. and the pressure is in a range from the normal pressure to 1.0 MPa.

The process provided by the present invention has no special limit to the suitable gasoline containing organic sulfides, which is applicable to catalytic cracked full-range gasoline, the light fraction of the catalytic cracked gasoline with boiling points below 100° C., or the hydrogenation product of the heavy fraction of the catalytic cracked gasoline with boiling points above 100° C., and other gasoline products. The organic sulfides can be thiols, thioethers, thiophene, alkyl thiophenes and/or benzothiophenes, etc, the contents of which can be 100–5000 ppm (based on the weight of sulfur element).

The process provided by the present invention has no special limit to the suitable diesel oil containing organic sulfides either, which process is applicable to either straight-run diesel oil, catalytic diesel oil or coked diesel oil wherein the content of sulfur can be 500–10000 ppm. However, considering that a large part of the organic sulfides in diesel oil such as thiols, thioethers, thiophene, etc, can be readily removed by hydrogenation, it is preferable to use hydrodesulfurized diesel oil in the process provided by the present invention in economical and practical point of view. The major organic sulfides are those difficult to be removed by the conventional process such as benzothiophenes and/or dibenzothiophenes and their derivatives, etc, wherein the sulfur content is 20–500 ppm.

Organic sulfides-containing aromatics lower than $C_{12}$ suitable for the process provided by the present invention include benzene, toluene, ethyl benzene, xylene, or $C_9$–$C_{12}$ aromatics, or the mixture thereof. The organic sulfides can be thiols, thioethers, thiophene, alkyl thiophenes and/or benzothiophenes, etc, and the content thereof is 0.1–200 ppm (based on the weight of sulfur element).

In the XRD pattern of the amorphous alloy with nickel as a major active component used in the adsorptive desulfurization process provided by the present invention there is only one broad diffuse peak at $2\theta=45°$ in a $2\theta$ range from $20°$ to $80°$. The composition of amorphous alloy includes 50–95 wt % of nickel, 1–30 wt % of aluminum, 0–35 wt % of iron, and 0–10 wt % of one or more metals selected from the group consisting of copper, zinc, molybdenum, chromium, and cobalt and may also contain 0–20 wt % of phosphorus. The process used in the present invention to prepare the amorphous alloy can be referred to another patent U.S. Pat. No. 6,368,996 of the inventor of the present invention.

The proper diameter of the particle of the adsorbent used in the present invention is 10–1000 $\mu$m, preferably 30–500 $\mu$m.

The contact conditions in the process provided by the present invention are under a temperature in a range from room temperature to 120° C., a pressure in a range from the normal pressure to 1.0 MPa. The preferred conditions are under a temperature in a range from room temperature to 80° C. and a pressure in a range from the normal pressure to 0.5 MPa. The most preferred pressure is the normal pressure.

The process provided by the present invention can be carried out in a fluidized bed reactor, a magnetic-stabilized fluidized bed reactor, or a slurry bed reactor.

When the adsorptive desulfurization is carried out in a fluidized bed reactor, the liquid hourly space velocity can be 2–40 $hr^{-1}$, preferably 5–30 $hr^{-1}$.

The magnetic-stabilized fluidized bed reactor is a reactor having a uniform magnetic field and a kind of ferromagnetic adsorbent, which has inter-particle attraction and stably exists in the reactor without flowing with the feedstock stream due to the magnetization of the magnetic field. The reactor consists of a reactor and an outside magnetic field, which is a uniform and stable magnetic field in the axial direction of the reactor. The uniform magnetic field is provided by a D.C. electric source and a series of Helmholtz coils or uniformly and densely wound solenoids coaxial with the reactor, and the reactor and its other components are made from the materials with good magnet permeability.

When the adsorptive desulfurization is carried out in the magnetic-stabilized fluidized bed reactor, the suitable liquid hourly space velocity is 2–40 $hr^{-1}$, preferably 5–30 $hr^{-1}$, and the intensity of the magnetic field at the center of the magnetic-stabilized fluidized bed is in the range between 10–1000 oersted, preferably 50–600 oersted. The particles of the adsorbent can be loaded into the reactor alone or premixed with 20–200% (on the basis of the weight of the adsorbent) of iron powders to enhance the magnetism of the adsorbent. The adsorbent can immovably exist in the reactor or go in and out continuously or intermittently according to the need of operation.

The magnetic-stabilized fluidized bed reactor can be operated in such a way: first, particles of said adsorbent or a mixture of said adsorbent and iron powder is loaded into the reactor, then certain electric current is passed through the coils of the reactor to provide a uniform and stable magnetic field and the sulfur-containing feedstock enters into the bed from the bottom of the reactor to contact with the adsorbent.

When the adsorptive desulfurization is carried out in a slurry bed reactor, the concentration of the adsorbent can be 0.5–30 wt %, preferably 1–20 wt %, and the residence time is 0.5–60 minutes, preferably 3–30 minutes.

The following examples will further describe the process provided by the present invention, but not intend to limit the scope of protection of the invention.

EXAMPLE 1

The present example shows the preparation of a amorphous adsorbent used in the present invention.

48 g of nickel, 48 g of aluminum, 1.5 g of iron, and 2.5 g of chromium were added to a quartz tube heated in a high-frequency furnace to above 1300° C. for liquidation and alloying, and then the liquidated alloy was extruted out by the force of an inert gas from a nozzle at the lower end of the tube onto a rapidly spinning, copper roller at a rate of 800 rpm filled with cooling water, and was then cooled down rapidly and thrown out tangentially to form a scaly strip. The strip was ground to particles of about 70 $\mu$m in size as a precursor (i.e. parent alloy) for use. The parent alloy was thermally treated in a hydrogen environment at 700° C. for 3 h and the treated master alloy was slowly added into a three-necked bottle containing 500 g of 20% aqueous solution of sodium hydroxide, which was controlled at a constant temperature of 100° C. and stirred for 1 hr. After heating and stirring were stopped, the liquid was decanted away and the alloy was washed with distilled water until the pH reached 7. Water was decanted, an adequate amount of benzene was added, and water was removed by azeotropic distillation at the normal pressure. The prepared adsorbent was numbered as adsorbent-1, which was stored in benzene for use. The composition of adsorbent-1 is shown in Table 1.

EXAMPLE 2–5

Other amorphous alloy adsorbents with various components and different positions were prepared according to the procedure of Example 1. The compositions of adsorbent-2 to adsorbent-5 are listed in Table 1.

The XRD patterns of the above various adsorbents bear the same character, i.e. there is only a broad diffuse peak at $2\theta=45°$ in the $2\theta$ range between $20°$ and $80°$.

TABLE 1

| Example | Adsorbent No. | Adsorbent composition |
|---|---|---|
| 1 | Adsorbent-1 | $Ni_{83.5}Fe_{2.6}Cr_{4.3}Al_{9.6}$ |
| 2 | Adsorbent-2 | $Ni_{86.7}Co_{8.3}Al_{5.0}$ |
| 3 | Adsorbent-3 | $Ni_{90.1}Mo_{3.2}Al_{6.7}$ |
| 4 | Adsorbent-4 | $Ni_{58.4}Fe_{32.3}Al_{9.3}$ |
| 5 | Adsorbent-5 | $Ni_{71.0}Cu_{9.5}A_{19.5}$ |

EXAMPLES 6–12

These examples show the effect of the adsorptive desulfurization process provided by the present invention for removing, organic sulfides in gasoline in a fluidized bed reactor.

10 ml (20 g) of the adsorbent with particle diameters of 60–80 μm was added into a fluidized bed reactor with an inner diameter of 15 mm and a length of 500 mm, and the feed was pumped into the reactor from the bottom.

As a feed for adsorptive desulfurization, feed-1 was a catalytic cracked full-range gasoline, which were basically characterized by a density of 0.7200 g/ml and a sulfur content of 1800 ppm.

Feed-2 was a hydrotreated heavy fraction oil of catalytic cracked gasoline, which were basically characterized by a density of 0.7800 g/ml and a sulfur content of 335 ppm.

Feed-3 was a light distillate oil of catalytic cracked gasoline, which were basically characterized by a density of 0.6600 g/ml and a sulfur content of 265 ppm.

The sulfur content in gasoline after adsorption was measured by the microcoulometric method. The results are shown in Table 2.

EXAMPLES 21–32

These examples show the effect of the adsorptive desulfurization process provided by the present invention for removing organic sulfides in gasoline in a slurry bed reactor.

250 ml of a gasoline feed and a certain amount of adsorbent were added into a 0.5 liter stirred tank. The space above the liquid was protected by filling nitrogen. The feed was stirred in 280 rpm at the normal pressure and a given temperature, then was sedimentated naturally to separate the adsorbent and gasoline.

Three gasoline feeds for adsorptive desulfurization were the same as Examples 6–12. The sulfur content in gasoline after adsorption was measured by the microcoulometric method. The results are shown in Table 4.

TABLE 2

| Example | Gasoline | Adsorbent | Temperature (° C.) | Pressure (MPa) | Space velocity (hr$^{-1}$) | Sulfur in product (ppm) | Desulfurization rate (wt %) |
|---|---|---|---|---|---|---|---|
| 6 | Feed-1 | Adsorbent-2 | 80 | 0.5 | 6 | 700 | 61.1 |
| 7 | Feed-1 | Adsorbent-1 | 60 | NP | 15 | 590 | 67.2 |
| 8 | Feed-2 | Adsorbent-4 | 25 | NP | 12 | 13 | 96.1 |
| 9 | Feed-2 | Adsorbent-3 | 60 | 0.5 | 12 | <1 | >99.7 |
| 10 | Feed-2 | Adsorbent-1 | 60 | 0.5 | 12 | <1 | >99.7 |
| 11 | Feed-3 | Adsorbent-3 | 40 | 0.5 | 6 | 18 | 93.2 |
| 12 | Feed-3 | Adsorbent-1 | 40 | NP | 10 | 22 | 91.7 |

NP: refers to the normal pressure

EXAMPLES 13–20

These examples show the effect of the adsorptive desulfurization process provided by the present invention for removing organic sulfides in gasoline in a magnetic-stabilized fluidized bed reactor.

10 ml of the adsorbent with particle diameters of 60–80 μm was added into a reactor with an inner diameter of 14 mm. Four coils with an inner diameter of 55 mm, outer diameter of 165 mm, height of 35 mm, and turn number of 370 were arranged along the axial direction of the reactor to provide a uniform magnetic field. The distance between said coils was 27.5 mm. The feed entered into the reactor from the bottom and left from the top.

Three gasoline feeds for the adsorptive desulfurization were the same as Examples 6–12. The sulfur content in gasoline after adsorption was measured by the microcoulometric method. The results are shown in Table 3

TABLE 3

| Example | Gasoline | Adsorbent | Temperature (° C.) | Pressure (MPa) | Space velocity (hr$^{-1}$) | Intensity of magnetic field (Oe) | Sulfur in product (wt %) | Desulfurization rate (wt %) |
|---|---|---|---|---|---|---|---|---|
| 13 | Feed-1 | Adsorbent-2 | 80 | 0.2 | 6 | 200 | 600 | 66.7 |
| 14 | Feed-1 | Adsorbent-3 | 60 | 0.2 | 15 | 200 | 420 | 76.7 |
| 15 | Feed-1 | Adsorbent-1 | 25 | NP | 20 | 200 | 450 | 75.0 |
| 16 | Feed-2 | Adsorbent-4 | 60 | 1.0 | 15 | 200 | <1 | >99.7 |
| 17 | Feed-2 | Adsorbent-3 | 60 | 0.5 | 15 | 200 | <1 | >99.7 |
| 18 | Feed-2 | Adsorbent-1 | 25 | NP | 15 | 200 | <1 | >99.7 |
| 19 | Feed-3 | Adsorbent-3 | 40 | 0.5 | 20 | 200 | <1 | >99.7 |
| 20 | Feed-3 | Adsorbent-1 | 40 | NP | 20 | 200 | 5 | 98.1 |

NP: refers to the normal pressure

TABLE 4

| Example | Gasoline | Number of adsorbent | Amount of adsorbent (g) | Temperature (° C.) | Residence time (min) | Sulfur content after adsorption t (wt %) | Desulfurization rate (wt %) |
|---|---|---|---|---|---|---|---|
| 21 | Feed-1 | Adsorbent-4 | 40 | 20 | 5 | 610 | 66.1 |
| 22 | Feed-1 | Adsorbent-2 | 40 | 20 | 5 | 600 | 66.6 |
| 23 | Feed-1 | Adsorbent-3 | 40 | 20 | 5 | 400 | 77.8 |
| 24 | Feed-1 | Adsorbent-1 | 40 | 20 | 5 | 470 | 73.9 |
| 25 | Feed-2 | Adsorbent-4 | 10 | 60 | 5 | 76 | 77.3 |
| 26 | Feed-2 | Adsorbent-2 | 10 | 60 | 5 | 42 | 87.2 |
| 27 | Feed-2 | Adsorbent-3 | 10 | 60 | 5 | 13 | 96.1 |
| 28 | Feed-2 | Adsorbent-5 | 10 | 60 | 5 | 81 | 75.8 |
| 29 | Feed-2 | Adsorbent-1 | 10 | 60 | 5 | 17 | 94.9 |
| 30 | Feed-3 | Adsorbent-2 | 20 | 40 | 10 | 2.6 | 99.0 |
| 31 | Feed-3 | Adsorbent-3 | 20 | 40 | 10 | <1 | >99.6 |
| 32 | Feed-3 | Adsorbent-1 | 20 | 40 | 10 | <1 | >99.6 |

EXAMPLES 33–44

These examples show the effect of the adsorptive desulfurization process provided by the present invention for removing organic sulfides in aromatics lower than $C_{12}$ in a fluidized bed reactor.

10 ml (20 g) of the adsorbent with particle diameters of 60–80 μm was added into a fluidized bed reactor with an inner diameter of 15 mm and a length of 500 mm. Aromatics lower than $C_{12}$ containing organic sulfides were pumped into the reactor from the bottom in a certain space velocity to carry out adsorptive desulfurization at the normal pressure. The sulfur content in the aromatics after adsorption was measured by the microcoulometric method. The results are shown in Table 5.

EXAMPLES 45–62

These examples show the effect of the adsorptive desulfurization process provided by the present invention for removing organic sulfides in aromatics lower than $C_{12}$ in a magnetic-stabilized fluidized bed reactor.

10 ml of the adsorbent with particle diameters of 60–80 μm was added into a reactor with an inner diameter of 14 mm. Four coils with an inner diameter of 55 mm, outer diameter of 165 mm, height of 35 mm, and turn number of 370 were arranged along the axial direction of the reactor to provide a uniform magnetic field. The distance between said coils was 27.5 mm. Aromatics lower than $C_{12}$ entered into the reactor from the bottom and left from the top. The adsorptive desulfurization was carried out at various intensities of the magnetic field, temperatures, pressures, and space velocities. The sulfur content in the aromatics after adsorption was measured by the microcoulometric method. The results are shown in Table 6.

TABLE 5

| | | | Adsorption condition | | Sulfur content in aromatics (ppm) | |
|---|---|---|---|---|---|---|
| Example | Adsorbent | Type of aromatics | Temperature (° C.) | Space velocity (hr$^{-1}$) | Before adsorption | After adsorption |
| 33 | Adsorbent-1 | Benzene | 20 | 15 | 2 | 0.033 |
| 34 | Adsorbent-1 | Benzene | 40 | 15 | 2 | 0.025 |
| 35 | Adsorbent-1 | Benzene | 60 | 15 | 2 | 0.018 |
| 36 | Adsorbent-1 | Benzene | 80 | 15 | 2 | 0.027 |
| 37 | Adsorbent-1 | Benzene | 60 | 10 | 2 | 0.017 |
| 38 | Adsorbent-1 | Benzene | 60 | 20 | 2 | 0.022 |
| 39 | Adsorbent-2 | Benzene | 60 | 15 | 2 | 0.020 |
| 40 | Adsorbent-3 | Benzene | 60 | 15 | 2 | 0.018 |
| 41 | Adsorbent-4 | Benzene | 60 | 15 | 2 | 0.035 |
| 42 | Adsorbent-1 | Benzene | 60 | 15 | 0.5 | 0.016 |
| 43 | Adsorbent-1 | Mixed toluenes | 60 | 15 | 5 | 0.029 |
| 44 | Adsorbent-1 | $C_9$ aromatics | 60 | 15 | 12 | 0.033 |

TABLE 6

| Example | Adsorbent | Type of aromatics | Intensity of magnetic field (Oe) | Adsorption condition T (° C.) | Adsorption condition P (MPa) | Space velocity ($h^{-1}$) | Sulfur in aromatics (ppm) Before adsorption | Sulfur in aromatics (ppm) After adsorption |
|---|---|---|---|---|---|---|---|---|
| 45 | Adsorbent-1 | Benzene | 50 | 60 | NP | 18 | 2 | 0.013 |
| 46 | Adsorbent-1 | Benzene | 100 | 60 | NP | 18 | 2 | 0.015 |
| 47 | Adsorbent-1 | Benzene | 300 | 60 | NP | 18 | 2 | 0.018 |
| 48 | Adsorbent-1 | Benzene | 600 | 60 | NP | 18 | 2 | 0.053 |
| 49 | Adsorbent-2 | Benzene | 200 | 60 | NP | 18 | 2 | 0.020 |
| 50 | Adsorbent-3 | Benzene | 200 | 60 | NP | 18 | 2 | 0.016 |
| 51 | Adsorbent-4 | Benzene | 200 | 60 | NP | 18 | 2 | 0.038 |
| 52 | Adsorbent-1 | Benzene | 200 | 20 | NP | 18 | 2 | 0.027 |
| 53 | Adsorbent-1 | Benzene | 200 | 40 | NP | 18 | 2 | 0.018 |
| 54 | Adsorbent-1 | Benzene | 200 | 60 | NP | 18 | 2 | 0.015 |
| 55 | Adsorbent-1 | Benzene | 200 | 80 | NP | 18 | 2 | 0.038 |
| 56 | Adsorbent-1 | Benzene | 200 | 60 | 0.5 | 18 | 2 | 0.016 |
| 57 | Adsorbent-1 | Benzene | 200 | 60 | NP | 9 | 2 | Undetected |
| 58 | Adsorbent-1 | Benzene | 200 | 60 | NP | 26 | 2 | 0.022 |
| 59 | Adsorbent-1 | Benzene | 200 | 60 | NP | 32 | 2 | 0.057 |
| 60 | Adsorbent-1 | Benzene | 200 | 60 | NP | 18 | 0.5 | 0.010 |
| 61 | Adsorbent-1 | Mixed toluenes | 200 | 60 | NP | 18 | 5 | 0.025 |
| 62 | Adsorbent-1 | $C_9$ aromatics | 200 | 60 | NP | 18 | 12 | 0.028 |

NP: refers to the normal pressure

EXAMPLE 63–71

These examples show the effect of the adsorptive desulfurization process provided by the present invention for removing organic sulfides in aromatics lower than $C_{12}$ in a slurry bed reactor.

150 ml of benzene containing 2 ppm of thiophene sulfur and adsorbent-1 with particle diameters of 60–80 μm were added into a 0.3 liter stirred tank. The content was stirred at the normal pressure and 300 rpm for certain time. After sampling, the adsorbent was sedimentated with a magnet and the sulfur content in benzene was analyzed. The results are shown in Table 7.

TABLE 7

| Example | Concentration of adsorbent (wt %) | Adsorption temperature (° C.) | Residence time (min) | Sulfur in aromatics (ppm) Before adsorption | Sulfur in aromatics (ppm) After adsorption |
|---|---|---|---|---|---|
| 63 | 4 | 20 | 5 | 2 | 0.033 |
| 64 | 4 | 40 | 5 | 2 | 0.025 |
| 65 | 4 | 60 | 5 | 2 | 0.018 |
| 66 | 4 | 80 | 5 | 2 | 0.013 |
| 67 | 2 | 60 | 5 | 2 | 0.020 |
| 68 | 5 | 60 | 5 | 2 | 0.018 |
| 69 | 8 | 60 | 5 | 2 | 0.015 |
| 70 | 4 | 60 | 10 | 2 | 0.010 |
| 71 | 4 | 60 | 15 | 2 | 0.008 |

NP: refers to the normal pressure

EXAMPLES 72–78

These examples show the effect of the adsorptive desulfurization process provided by the present invention for removing organic sulfides in diesel oil in a slurry bed reactor.

100 ml of diesel oil and 1 g of adsorbent with particle diameters of 60–80 μm were added into a 0.3 liter stirred tank. The space above the liquid was protected by filling nitrogen. The slurry was stirred at the normal pressure and 300 rpm for 10 minutes and then settled naturally to separate the adsorbent and diesel oil.

The diesel oil was a catalytic diesel oil from which most sulfides were removed by hydrodesulfurization and it was basically characterized by a density of 0 8400 g/cm³, a distillation range of 204–371° C., and a sulfur content of 70 ppm.

The sulfur content in diesel oil after adsorption seas determined by a high resolution gas chromatograph equipped with an atomic emission detector (GC-AED). The results are shown in Table 8.

TABLE 8

| Example | Adsorbent | Adsorption temperature (° C.) | Sulfur content after adsorption (ppm) |
|---|---|---|---|
| 72 | Adsorbent-1 | 60 | 10 |
| 73 | Adsorbent-1 | 80 | 11 |
| 74 | Adsorbent-1 | 100 | 11 |
| 75 | Adsorbent-2 | 100 | 14 |
| 76 | Adsorbent-3 | 100 | 15 |
| 77 | Adsorbent-4 | 100 | 20 |
| 78 | Adsorbent-5 | 100 | 30 |

The present application claims priority under 35 U.S.C. §119 of Chinese Patent Application No. 01130631.9, filed on Aug. 16, 2001, No. 01130632.7, filed on Aug. 16, 2001, No. 01130633.5, filed on Aug. 16, 2001, No. 01130634.3, filed on Aug. 16, 2001, and No. 02126016.8, filed on Aug. 9, 2002. The disclosures of all these cited priority applications are expressly incorporated by reference herein in its entirety.

What is claimed is:

1. A process for adsorptive desulfurization of light oil distillates comprising contacting the organic sulfide impurities-containing light oil distillates with an adsorbent which comprises nickel as a major active component to carry out adsorptive desulfurization, wherein the adsorbent used is a nickel-based amorphous alloy and the contacting adsorption is carried out under the conditions of a temperature in range from room temperature to 120° C. and a pressure in a range from the normal pressure to 1.0 MPa.

2. The process according to claim 1, wherein said light oil distillates are a gasoline containing 100–5000 ppm of sulfur, or a diesel oil containing 20–500 ppm of sulfur, or aromatics lower than $C_{12}$ containing 0.1–200 ppm of sulfur (based on the weight of sulfur).

3. The process according to claim 1, wherein said organic sulfides are thiols, thioethers, thiophene, alkyl thiophenes, benzothiophenes, and/or dibenzothiophenes and their derivatives.

4. The process according to claim 1, wherein there is a single diffuse peak at $2\theta=45°$ in a $2\theta$ range from 20° to 80° in the XRD pattern of said adsorbent.

5. The process according to claim 1, wherein said adsorbent consists of 50–95 wt % of nickel, 1–30 wt % of aluminum, 0–35 wt % of iron, and 0–10 wt % of one or more copper, zinc, molybdenum, chromium, and cobalt.

6. The process according to claim 1, wherein the particle diameter of said adsorbent is 10–1000 μm.

7. The process according to claim 6, wherein the particle diameter of said adsorbent is 30–500 μm.

8. The process according to claim 1, wherein said contact adsorption is carried out in a fluidized bed reactor with a liquid hourly space velocity of 2–40 $hr^{-1}$.

9. The process according to claim 8, wherein said liquid hourly space velocity is 5–30 $hr^{-1}$.

10. The process according to claim 8, wherein said fluidized bed reactor is a magnetic-stabilized fluidized bed reactor and the intensity of the magnetic field is 10–1000 oersted.

11. The process according to claim 10, wherein the intensity of the magnetic field in said magnetic-stabilized fluidized bed reactor is 50–600 oersted and the liquid hourly space velocity is 5–30 $hr^{-1}$.

12. The process according to claim 10, wherein iron powder accounting for 20–200 % of the total weight of the adsorbent can be harmoniously incorporated into the adsorbent in said magnetic-stabilized fluidized bed reactor.

13. The process according to claim 1, wherein said contact adsorption can be carried out in a slurry bed reactor, wherein the concentration of the adsorbent is 0.5–30 wt % and the residence time is 0.5–60 minutes.

14. The process according to claim 13, wherein the concentration of said adsorbent is 1–20 wt % and the residence time is 3–30 minutes.

* * * * *